(12) United States Patent
Flosbach et al.

(10) Patent No.: US 7,211,621 B2
(45) Date of Patent: May 1, 2007

(54) POLYURETHANEUREA RESINS WITH TRIALKOXYSILANE GROUPS AND PROCESSES FOR THE PRODUCTION THEREOF

(75) Inventors: Carmen Flosbach, Wuppertal (DE); Stefanie Matten, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 361 days.

(21) Appl. No.: 10/776,376

(22) Filed: Feb. 11, 2004

(65) Prior Publication Data

US 2005/0176879 A1    Aug. 11, 2005

(51) Int. Cl.
- *C08G 77/04* (2006.01)
- *C08J 3/00* (2006.01)
- *C08K 3/20* (2006.01)
- *C08L 75/00* (2006.01)
- *C08L 83/00* (2006.01)

(52) U.S. Cl. ............ 524/588; 524/589; 524/590; 528/25; 528/26; 528/28; 528/29; 528/38; 528/41; 528/44; 528/59; 528/60; 528/65; 528/77; 528/80; 528/81; 528/85

(58) Field of Classification Search ............ 524/588, 524/589, 590; 528/25, 26, 28, 29, 38, 41, 528/44, 59, 60, 65, 77, 80, 81, 85
See application file for complete search history.

(56) References Cited

U.S. PATENT DOCUMENTS 5,760,123 A    6/1998   Vogt-Birnbrich et al.

FOREIGN PATENT DOCUMENTS

EP    0687713 A1    12/1995
WO    WO 03/106055 A1    12/2003

OTHER PUBLICATIONS

The European Search Report Application No. EP 04025889, Mailed: Jul. 6, 2005.

*Primary Examiner*—Patrick Niland

(57) ABSTRACT

Polyurethaneurea resins containing at least one group of the formula (I)

$$-NH(CO)XOR^1O(CO)CHR^2CH_2N[C_nH_{2n}Si(OR^3)_3](CO)NH- \quad (I)$$

and/or at least one group of the formula (II)

$$\{-NH(CO)XO\}_a\{CH_2=CR^2(CO)O\}_bR^4\{O(CO)CHR^2CH_2N[C_nH_{2n}Si(OR^3)_3](CO)NH-\}_c \quad (II)$$

wherein
$X=[O(CH_2)_4]_q(OC_2H_4)_x(OC_3H_6)_y[(CH_2)_5(CO)]_z$;
$q=0$ to 10;
$x=0$ to 20;
$y=0$ to 20;
$z=0$ to 10;
$n=2$ or 3;
$a=1$ or 2;
$b=0$ to 4;
$c=1$ to 5;
$R^1=-C_2H_4-$, $-C_3H_6-$, $-C_4H_8-$, $-CH(CH_2O(CO)R^5)CH_2-$ or $-CH_2CH(O(CO)R^5)CH_2-$;
$R^2=H$ or $CH_3$;
$R^3=C1$ to C4 alkyl;
$R^4=a+b+c$-valent, saturated hydrocarbon residue of a (cyclo) alkane polyol with $a+b+c$ hydroxyl groups;
$R^5=$an acid residue of a monocarboxylic acid,
with the proviso that $a+b+c=3$ to 6 and wherein the sequence of the subformulae indicated q, x, y and z may be varied at will and q, x, y and z in each case merely state the number of instances of the particular subformulae contained in the formulae (I) and (II).

8 Claims, No Drawings

POLYURETHANEUREA RESINS WITH TRIALKOXYSILANE GROUPS AND PROCESSES FOR THE PRODUCTION THEREOF

FIELD OF THE INVENTION

The present invention relates to novel polyurethaneurea resins with trialkoxysilane groups and to processes for the production thereof.

BACKGROUND OF THE INVENTION

Polyurethaneurea resins with trialkoxysilane groups and methods for the production thereof are known per se.

For example, isocyanate-functional polyurethane prepolymers and/or isocyanate-functional polyurethaneurea prepolymers may be reacted with trialkoxysilanes carrying primary or secondary amino groups to yield polyurethaneurea resins with terminal trialkoxysilane groups. Such polyurethaneurea resins with trialkoxysilane groups are described, for example, in U.S. Pat. No. 5,760,123 as starting products for the production of aqueous dispersions of polyurethaneurea resins with siloxane bridges.

Alternatively, functionalized polyurethaneurea resins may be reacted in a polymer-analogous reaction with suitably functionalized trialkoxysilanes, i.e., trialkoxysilanes which comprise groups which are complementarily reactive towards the functional groups of the polyurethaneurea resins, to yield polyurethaneurea resins with trialkoxysilane groups.

SUMMARY OF THE INVENTION

The present invention provides novel polyurethaneurea resins with trialkoxysilane groups, which differ from hitherto known polyurethaneurea resins with trialkoxysilane groups with regard to the chemical incorporation of the trialkoxysilane groups in the polyurethaneurea resin and thus extend the range of polyurethaneurea resins with trialkoxysilane groups. The invention furthermore provides processes for the production of polyurethaneurea resins, which processes, when required, also permit the polyurethaneurea resins to be provided with a comparatively elevated content of trialkoxysilane groups. When required, the processes also provide an elegant pathway to providing the polyurethaneurea resins with additional functional groups in addition to the trialkoxysilane groups incorporated in the novel manner.

The invention relates to polyurethaneurea resins with trialkoxysilane groups, wherein the polyurethaneurea resins contain at least one group of the formula (I)

(I)

and/or at least one group of the formula (II)

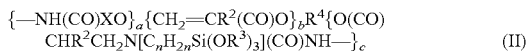
(II)

wherein
$X=[O(CH_2)_4]_q(OC_2H_4)_x(OC_3H_6)_y[O(CH_2)_5(CO)]_z$;
q=0 to 10, preferably 0;
x=0 to 20, preferably 0;
y=0 to 20, preferably 0;
z=0 to 10, preferably 0;
n=2 or 3;
a=1 or 2;
b=0 to 4, in particular 0;
c=1 to 5;
$R^1$=—$C_2H_4$—, —$C_3H_6$—, —$C_4H_8$—, —$CH(CH_2O(CO)R^5)CH_2$— or —$CH_2CH(O(CO)R^5)CH_2$—, preferably —$C_2H_4$—, —$C_3H_6$— or —$C_4H_8$—;
$R^2$=H or $CH_3$, preferably H;
$R^3$=C1 to C4 alkyl;
$R^4$=a+b+c-valent, saturated hydrocarbon residue of a (cyclo)alkane polyol with a+b+c hydroxyl groups;
$R^5$=an acid residue of a monocarboxylic acid,
with the proviso that a+b+c=3 to 6 and wherein the sequence of the subformulae indicated q, x, y and z may be varied at will and q, x, y and z in each case merely state the number of instances of the particular subformulae contained in the formulae (I) and (II).

DETAILED DESCRIPTION OF THE EMBODIMENTS

Groups (I) and (II) respectively of the polyurethaneurea resins according to the invention are formally derived from the addition of isocyanate groups of polyisocyanate and/or isocyanate-functional polyurethane prepolymer and/or isocyanate-functional polyurethaneurea prepolymer onto hydroxyl and secondary amino groups of addition products formed by the reaction of primary amino group and (meth)acryloyl group, preferably acryloyl group, from aminoalkyltrialkoxysilane with a primary amino group and compounds of the formula (III)

(III)

and of the formula (IV) respectively

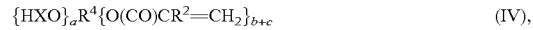
(IV), wherein
$X=[O(CH_2)_4]_q(OC_2H_4)_x(OC_3H_6)_y[O(CH_2)_5(CO)]_z$;
q=0 to 10, preferably 0;
x=0 to 20, preferably 0;
y=0 to 20, preferably 0;
z=0 to 10, preferably 0;
n=2 or 3;
a=1 or 2;
b=0 to 4, in particular 0;
c=1 to 5;
$R^1$=—$C_2H_4$—, —$C_3H_6$—, —$C_4H_8$—, —$CH(CH_2O(CO)R^5)CH_2$— or —$CH_2CH(O(CO)R^5)CH_2$—, preferably —$C_2H_4$—, —$C_3H_6$—, or —$C_4H_8$—;
$R^2$=H or $CH_3$, preferably H;
$R^3$=C1 to C4 alkyl;
$R^4$=a+b+c-valent, saturated hydrocarbon residue of a (cyclo)alkane polyol with a+b+c hydroxyl groups;
$R^5$=an acid residue of a monocarboxylic acid
with the proviso that a+b+c=3 to 6 and wherein the sequence of the subformulae indicated q, x, y and z may be varied at will and q, x, y and z in each case merely state the number of instances of the particular subformulae contained in the formulae (III) and (IV).

The term "(meth)acryloyl" used in the present description and in the claims means "methacryloyl" or "acryloyl", preferably "acryloyl".

The groups (I) and (II) have CONH groups on both or on their a+c termini, via the NH nitrogen atoms of which they are incorporated into the polyurethaneurea resins. The trialkoxysilane functions of groups (I) and (II) respectively are thus present as non-terminal groups in the polyurethaneurea resins. The nitrogen substituted with the $[C_nH_{2n}Si(OR^3)_3]$ group in groups (I) and (II) respectively is tertiary and carries no hydrogen. It is assumed that this is the cause of the relatively slight tendency of the polyurethaneurea resins according to the invention to form hydrogen bridges, which, for example, makes it possible to obtain a low solution viscosity of organic solutions of the polyurethaneurea resins according to the invention or compositions formulated therewith.

The polyurethaneurea resins according to the invention contain groups (I) and/or (II) in an amount corresponding to a silicon content of, for example, 1.4 to 5 wt. %.

The polyurethaneurea resins according to the invention may contain the trialkoxysilane functions of groups (I) and/or (II) as the only functional groups. They may, however, also comprise one or more further functional groups, provided that the latter are compatible with the trialkoxysilane functions of groups (I) and (II) respectively and with one another, for example, isocyanate groups, carboxyl groups, (meth)acryloyl groups, hydroxyl groups or trialkoxysilane functions which are present other than as a constituent of groups (I) or (II).

The invention also relates to processes for the production of the polyurethaneurea resins according to the invention.

A first process for the production of the polyurethaneurea resins according to the invention consists in initially producing, in a first step, synthesis building blocks which are suitable for introducing groups (I) and/or (II) into the polyurethaneurea resins and simultaneously carry hydroxyl, secondary amino and trialkoxysilane functions. This proceeds by addition with the nucleophilic primary amino group of an aminoalkyltrialkoxysilane comprising a primary amino group onto the (meth)acryloyl group, preferably acryloyl group, of at least one compound (III) and/or onto the only one or one or more of the (meth)acryloyl group(s), preferably acryloyl group(s), of at least one compound (IV) with the formation of at least one correspondingly functionalized preadduct.

In the following step, the previously formed preadduct(s) and optionally additional compounds (A) capable of addition onto isocyanate groups are reacted with an isocyanate component consisting of polyisocyanate and/or isocyanate-functional polyurethane prepolymer and/or isocyanate-functional polyurethaneurea prepolymer with consumption of hydroxyl and secondary amino groups of the preadduct(s) and formation of a polyurethaneurea resin with groups (I) and/or (II).

The reaction of the preadducts with the isocyanate component may proceed in a single- or multi-stage synthesis sequence. For example, all starting materials may be reacted together simultaneously or a multistage method is used, for example, by adding different starting materials in succession and/or by adding identical starting materials successively in portions with a time delay.

In a second, preferred process for the production of the polyurethaneurea resins according to the invention, an isocyanate component consisting of polyisocyanate and/or isocyanate-functional polyurethane prepolymer and/or isocyanate-functional polyurethaneurea prepolymer is reacted in a first synthesis step comprising one or more stages with at least one compound (III) and/or at least one compound (IV) and optionally further compounds (A) capable of addition onto isocyanate groups with consumption of the isocyanate groups. Then, in a second synthesis step, aminoalkyltrialkoxysilane with the nucleophilic primary amino group is added onto the (meth)acryloyl groups, preferably acryloyl groups, of the reaction product obtained in the first synthesis step, said (meth)acryloyl groups originating from compounds (III) and/or (IV). While the primary amino groups are here completely consumed and converted into secondary amino groups, any (meth)acryloyl groups optionally present in excess may be retained. In a third synthesis step, the reaction product obtained in the second synthesis step is then reacted with a further isocyanate component consisting of polyisocyanate and/or isocyanate-functional polyurethane prepolymer and/or isocyanate-functional polyurethaneurea prepolymer and optionally with further compounds (A) capable of addition onto isocyanate groups. In this last synthesis step, the secondary amino groups formed in the preceding synthesis step react with isocyanate groups to form urea bridges, so simultaneously forming groups (I) and/or (II).

The processes for the production of the polyurethaneurea resins according to the invention may be performed in such a manner that polyurethaneurea resins are obtained which contain no further functional groups other than the trialkoxysilane functions of groups (I) and/or (II). They may, however, also be performed in such a manner that the polyurethaneurea resins comprise one or more further types of functional groups, but only provided that the latter are compatible with the trialkoxysilane functions of groups (I) and (II) respectively and with one another, for example, isocyanate groups, (meth)acryloyl groups, carboxyl groups, hydroxyl groups or trialkoxysilane groups which are present other than as a constituent of groups (I) or (II). Isocyanate groups may, for example, originate from polyisocyanate and/or isocyanate-functional polyurethane prepolymer and/or isocyanate-functional polyurethaneurea prepolymer introduced into the synthesis in stoichiometric excess. (Meth)acryloyl groups may, for example, originate from compounds' (IV) (meth)acryloyl groups, the latter having been in stoichiometric excess with regard to the reaction with aminoalkyltrialkoxysilane, or they may be introduced via suitable compounds (A). Carboxyl groups may, for example, originate from isocyanate-functional polyurethane prepolymer and/or isocyanate-functional polyurethaneurea prepolymer or be introduced via suitable compounds (A). Hydroxyl groups may, for example, originate from polyol and/or aminoalcohol used as compounds (A) in stoichiometric excess with regard to the reaction with isocyanate.

Examples of polyisocyanates usable in the processes for the production of the polyurethaneurea resins according to the invention are the conventional, in particular commercially available di- or triisocyanates, such as 1,6-hexane diisocyanate, isophorone diisocyanate, biscyclohexylmethane diisocyanate, cyclohexane diisocyanate, tetramethylxylylene diisocyanate, tolylene diisocyanate, diphenylmethane diisocyanate, or conventional commercially available polyisocyanates derived therefrom, for example, polyisocyanates of the biuret, uretidione or isocyanurate type.

Isocyanate-functional polyurethane prepolymers may be used as isocyanate-functional starting materials for the production of the polyurethaneurea resins according to the invention. Isocyanate-functional polyurethane prepolymers are known to the person skilled in the art and may be produced in conventional manner by reaction of polyisocyanates, for example, the polyisocyanates listed above, with low molecular weight, oligomeric and/or polymeric polyhydroxy-functional compounds. Examples of polyhydroxy-functional compounds are low molecular weight diols, such as ethylene glycol, the isomeric propane- and butanediols, neopentyl glycol, butylethylpropanediol, 1,6-hexanediol, cyclohexanediol, cyclohexanedimethanol; low molecular weight triols, such as trimethylolethane, trimethylolpropane, glycerol; low molecular weight polyols with more than three hydroxyl groups, such as pentaerythritol, sorbitol, dipentaerythritol; oligomeric or polymeric polyols with number average molar masses Mn of, for example, 500 to 3000 and hydroxyl values of, for example, 50 to 500 mg of KOH/g, for example, corresponding polyester polyols, polycarbonate polyols, polycaproplactone polyols, polyether polyols, hydroxy-functional (meth)acrylic copolymers.

Apart from the hydroxyl groups, the polyhydroxy-functional compounds may also comprise further, functional groups which are inert towards isocyanate groups, for example, carboxyl groups, (meth)acryloyl groups. Examples of polyhydroxy-functional compounds which also contain carboxyl groups are dimethylolpropionic acid, dimethylolbutyric acid, tartaric acid, polyester polyols containing carboxyl groups, simultaneously hydroxy- as well as carboxy-functional (meth)acrylic copolymers. Examples of polyhydroxy-functional compounds which also contain (meth)acryloyl groups are glycerol mono(meth)acrylate, trimethylolpropane mono(meth)acrylate.

Isocyanate-functional polyurethaneurea prepolymers may be used as isocyanate-functional starting materials for the production of the polyurethaneurea resins according to the invention. Isocyanate-functional polyurethaneurea prepolymers are known to the person skilled in the art and may be produced in conventional manner by reacting polyisocyanates, for example, the polyisocyanates listed above, with low molecular weight, oligomeric and/or polymeric compounds, which provide hydroxyl groups and primary or secondary amino groups for the reaction with the isocyanate groups.

The compounds which provide the hydroxyl groups and primary or secondary amino groups for the reaction with the isocyanate groups may comprise aminoalcohols and combinations of polyols and polyamines, polyols and aminoalcohols, polyamines and aminoalcohols or of polyols, polyamines and aminoalcohols. Examples of polyols may be found among the polyhydroxy-functional compounds stated in the paragraph above. The aminoalcohols comprise aminoalcohols with at least one amino group capable of addition with isocyanate groups, such as, for example, ethanolamine, diethanolamine, isopropanolamine or methylethanolamine. The polyamines comprise polyamines with at least two amino groups capable of addition with isocyanate groups, such as, for example, ethylenediamine, hexamethylenediamine, diethylenetriamine, triethylenetetramine.

Examples of aminoalkyltrialkoxysilanes with a primary amino group usable in the production of the polyurethaneurea resins according to the invention are aminoethyl- and aminopropyltrialkoxysilanes with C1 to C4 alkoxy residues attached to silicon. Preferred examples are the corresponding trimethoxy- and triethoxysilane compounds, in particular the trimethoxysilane compounds.

The monohydroxy compounds (III) usable in the production of the polyurethaneurea resins according to the invention preferably comprise compounds which do not contain a group X. Examples of preferred monohydroxy compounds of the formula (III) are in particular hydroxyethyl(meth)acrylate, the isomeric hydroxypropyl- and hydroxybutyl (meth)acrylates, but also adducts formed by addition of glycidyl(meth)acrylate onto monocarboxylic acid $R^5COOH$, such as acetic acid or propionic acid, or by addition of (meth)acrylic acid onto glycidyl esters of a monocarboxylic acid $R^5COOH$, in particular onto glycidyl esters of highly branched monocarboxylic acids such as, for example, Cardura® E (from Resolution Performance Products, Hoogvliet, Netherlands). As defined above in the formula (III), the monohydroxy compounds (III) may contain a group X with formula $[O(CH_2)_4]_q(OC_2H_4)_x(OC_3H_6)_y[O(CH_2)_5(CO)]_z$, wherein q=0 to 10, preferably 0, x=0 to 20, preferably 0, y=0 to 20, preferably 0, z=0 to 10, preferably 0. The sequence of the subformulae indicated q, x, y and z may be varied at will and the indices q, x, y and z in each case only state the number of instances of the particular subformulae. In the event that at least two of the indices q, x, y and z are not equal to 0 or not equal to 1, identical subformulae may be present in any desired sequence or in the form of blocks of two or more successive identical subformulae. Examples of compounds (III) containing groups X are the derivatives formed by ethoxylation, propoxylation, etherification with polytetrahydrofurandiol and/or by reaction with caprolactone of the compounds stated above to be preferred examples of monohydroxy compounds of the formula (III).

The compounds (IV) usable in the production of the polyurethaneurea resins according to the invention comprise (cyclo)alkane polyols of the formula $R^4(OH)_{a+b+c}$ esterified on b+c hydroxyl groups with (meth)acrylic acid, the a hydroxyl groups of which may be derivatised with groups X. The groups X have the same meaning as explained in the paragraph above relating to the compounds (III). The compounds (IV) preferably contain no groups X. Examples of compounds (IV) are trimethylolpropane mono- and di(meth) acrylate, glycerol mono- and di(meth)acrylate, pentaerythritol di- and tri(meth)acrylate, dipentaerythritol tetra- and penta(meth)acrylate or derivatives thereof containing groups X.

The further compounds (A) capable of addition onto isocyanate groups comprise polyols, polyamines or aminoalcohols, for example, the polyols, polyamines or aminoalcohols already mentioned above in connection with the production of isocyanate-functional polyurethane prepolymers or isocyanate-functional polyurethaneurea prepolymers. They may, however, also comprise compounds which are monofunctional with regard to a reaction with isocyanate groups, such as monoalcohols or primary or secondary monoamines. Both monoalcohols (A) and polyols (A) may comprise, apart from the hydroxyl groups, additional groups inert towards isocyanate groups, for example, carboxyl groups or (meth)acryloyl groups. Examples are compounds such as malic acid, dimethylolpropionic acid, dimethylolbutyric acid, tartaric acid, polyester polyols containing carboxyl groups, simultaneously hydroxy- and carboxy-functional (meth)acrylic copolymers, hydroxyalkyl(meth) acrylates, glycerol mono(meth)acrylate, glycerol di(meth) acrylate, trimethylolpropane mono(meth)acrylate, trimethylolpropane di(meth)acrylate.

The polyurethaneurea resins according to the invention are produced under the conventional conditions known to the person skilled in the art for the production of polyurethanes or polyureas from polyisocyanates and polyol or polyamine compounds, for example, at temperatures in the range from 20 to 100° C. In particular, the reaction is performed with exclusion of moisture and, when a solvent-free method is not used, using solvents which are inert towards isocyanate groups and alkoxysilane groups.

It is obvious to the person skilled in the art in the area of polyurethane or polyurea chemistry that the polyurethaneurea resins according to the invention may be varied in many different respects and to differing extents, for example, with regard to functionality, molar mass, structure, chemical properties and physical properties such as, for example, glass transition temperature or melting temperature. The person skilled in the art is aware of the means and methods available for influencing such features and thus technical properties. In particular, such means and methods comprise an appropriate selection from among the above-described starting materials with regard to nature and quantity and the type of reaction control during synthesis, for example, the sequence and rate of addition of the starting materials, and temperature control.

The polyurethaneurea resins according to the invention may be used directly, in particular as binders in compositions which cure on exposure to moisture, in particular on exposure to atmospheric humidity. Curing proceeds in this case by hydrolysis and condensation of the trialkoxysilane groups of the formulae (I) and (II) respectively with elimination of alcohol and formation of siloxane bridges. Moisture curing may proceed over a wide temperature range of, for example, from 20 to 200° C.

In the event that the polyurethaneurea resins according to the invention also contain, in addition to the trialkoxysilane groups of the formulae (I) and/or (II), further functional groups which are available for crosslinking reactions, so-called dual-cure compositions may also be formulated with the polyurethaneurea resins.

Dual-cure compositions may be purely thermally curable dual-cure compositions or compositions which cure on exposure to high-energy radiation and thermally. High-energy radiation means UV (ultraviolet) or electron beam radiation.

Thermally curable dual-cure compositions are characterized by binder/crosslinking agent systems which, on supply of thermal energy, i.e., heat, cure by means of more than one, generally two, different crosslinking reactions.

For example, if, apart from the trialkoxysilane functions of groups (I) and/or (II), the polyurethaneurea resins according to the invention additionally contain hydroxyl groups, catalyzed compositions formulated therewith may be cured as a self-crosslinking dual-cure system both by means of the moisture curing already explained above and by condensation of the hydroxyl and trialkoxysilane groups.

If, apart from the trialkoxysilane functions of groups (I) and/or (II), the polyurethaneurea resins additionally contain, for example, (meth)acryloyl groups, compositions formulated therewith, which contain thermal free-radical initiators, such as peroxide or azo initiators, may be cured thermally by free-radical polymerization of the (meth)acryloyl groups and also thermally by means of the moisture curing already explained above.

Dual-cure compositions which cure thermally and on exposure to high-energy radiation are characterized by binder/crosslinking agent systems which contain components or groups which allow for thermal cure as well as for cure on exposure to high-energy radiation. For example, if, apart from the trialkoxysilane functions of groups (I) and/or (II), the polyurethaneurea resins according to the invention contain (meth)acryloyl groups, compositions formulated therewith may be cured thermally by means of the moisture curing already described above and, by means of free-radical polymerization of the (meth)acryloyl groups, by irradiation with electron beam radiation or, if the compositions contain photoinitiators, by irradiation with UV radiation.

The compositions containing the polyurethaneurea resins according to the invention as binders may be solvent-based or solvent-free compositions, for example, adhesives, sealants and/or in particular coating compositions, for example, solvent-based or solvent-free liquid coating compositions or powder coatings. Apart from the polyurethaneurea resin binders, the compositions optionally contain further binders together with conventional constituents known to the person skilled in the art, for example, suitable crosslinking agents for the binders, pigments, extenders, catalysts and/or additives.

In the event that they are not directly used as a binder, the polyurethaneurea resins according to the invention may also be chemically modified before they are used as binders.

For example, the trialkoxysilane functions of groups (I) and (II) respectively may be hydrolyzed by reaction with water, wherein, depending upon reaction control, polyurethaneurea resins containing siloxane groups and/or silanol groups are obtained, which may be converted into aqueous dispersions by addition of appropriate quantities of water, in particular if the polyurethaneurea resins according to the invention contain hydrophilic groups, such as polyethylene oxide groups or ionic groups or groups convertible into ionic groups by neutralization.

Chemical modification of the polyurethaneurea resins according to the invention without using water is, for example, possible if the polyurethaneurea resins contain functional groups which are available for chemical reactions. In this case, the functionality may be modified or defunctionalizations may be performed by a polymer-analogous reaction.

The following Example illustrates the production and use of the polyurethaneurea resins according to the invention by way of example of a dual-cure powder coating which cures thermally and on exposure to high-energy radiation.

EXAMPLE a) 170 pbw (parts by weight) of isophorone diisocyanate, 0.40 pbw of methylhydroquinone and 0.10 pbw of dibutyltin dilaurate were initially introduced into a 1 liter, three-necked flask fitted with a stirrer, thermometer and dropping funnel and heated to 65° C. At 65° C., 61 pbw of butylethylpropanediol were added in such a manner that the temperature did not exceed 80° C. The temperature was maintained at 80° C. until an NCO value (weight percentage of NCO groups calculated as an MW of 42) of less than 13.9% was obtained. 88.5 pbw of hydroxyethyl acrylate were then added dropwise in such a manner that the temperature did not exceed 90° C. The temperature was maintained at 90° C. for a further 3 h (hours) until the NCO value fell below 0.1%. 61.50 pbw of aminopropyltrimethoxysilane (Dynasilan® AMEO from Degussa) were then added dropwise in such a manner that the temperature did not exceed 100° C. On completion of addition, 76.5 pbw of isophorone diisocyanate were added dropwise in such a manner that the temperature did not exceed 100° C. On completion of addition, the reaction mixture was heated to 120° C. and maintained at this temperature until an NCO value of less than 3.2% was obtained. At 120° C., 31 pbw of hydroxyethyl acrylate and then 11 pbw of butanediol monoacrylate were added dropwise in such a manner that the reaction temperature did not rise above 125° C. Once an NCO value of less than 0.1% had been obtained, the reaction mixture was poured into a flat aluminium dish and broken up once it had solidified.

The resultant brittle resin had a number average molecular weight Mn of 1700, a weight average Mw of 3800 and a glass transition determined by means of DSC of 29–41° C.

b) A comminuted mixture of the following components was premixed and extruded:

92.5 pbw of the binder from above Example a)

1.0 pbw of Irgacure® 2959 (photoinitiator from Ciba)

2.0 pbw of Powdermate 486 CFL (levelling additive from Troy Chemical Company)

1.5 pbw of Tinuvin® 144 (HALS light stabilizer from Ciba)

1.5 pbw of Tinuvin® CGL 1545 (UV absorber from Ciba)

1.5 pbw of p-toluenesulfonic acid blocked with diisopropylamine

A powder clear coating agent was produced after cooling, crushing and sieving of the comminuted mixture.

c) The powder clear coating agent from above Example b) was sprayed to a layer thickness of 80 μm onto steel panels coated with conventional electrodeposition primer, primer surfacer and base coat (flashed off) and, once melted, was baked for 20 minutes at 140° C. (object temperature) at a relative atmospheric humidity of 55%.

d) Immediately after removal from the baking oven, some of the powder-coated and baked test panels from above Example c) were subjected to additional curing by UV irradiation (medium pressure mercury emitter from Fusion, 240 W/cm, 100% power output, at a UV radiation emitter/object distance of 16 cm, at a belt speed of 3 m/min; corresponding to a radiation intensity of 500 mW/cm$^2$ and a radiation dose of 1500 mJ/cm$^2$).

The following Table shows the technical properties of the resultant coatings.

| Test methods: | | |
|---|---|---|
| | Thermal only | Thermal + UV |
| Amtec scratch resistance | 50 | 85 |
| Xylene test | OK | OK |
| Acid test | 15 | 25 |

Amtec scratch resistance, stated as residual gloss after reflow in %: Residual gloss was measured in % (ratio of initial gloss of the clear coat surface to its gloss after wash scratching, gloss measurement in each case being performed at an angle of illumination of 20°). Wash-scratching was performed using an Amtec Kistler laboratory car wash system (c.f. Th. Klimmasch and Th. Engbert, Entwicklung einer einheitlichen Laborprüfmethode für die Beurteilung der Waschstraßenbeständigkeit von Automobil-Decklacken [development of a standard laboratory test method for evaluating resistance of automotive top coats to car wash systems], in DFO proceedings 32, pages 59 to 66, technology seminars, proceedings of the seminar on 29-30.4.97 in Cologne, published by Deutsche Forschungsgesellschaft für Oberflächenbehandlung e.V., Aderstraße 94, 40215 Düsseldorf).

Xylene Test:

Brief description: A xylene-soaked filter paper is placed on the coating film and covered by a watch-glass for 10 minutes. Evaluation: OK=no visible change.

Acid Test:

Brief description: at 65° C., 50 μl drops of 36% sulfuric acid are placed at 1 minute intervals for 30 minutes onto the coating film.

Evaluation: Destruction of the film after x (0–30) minutes.

What is claimed is:

1. Polyurethaneurea resins comprising at least one group of the formula (I)

—NH(CO)XOR$^1$O(CO)CHR$^2$CH$_2$N[C$_n$H$_{2n}$Si(OR$^3$)$_3$](CO)NH— (I)

or at least one group of the formula (II)

{—NH(CO)XO}$_a${CH$_2$=CR$^2$(CO)O}$_b$R$^4${O(CO)CHR$^2$CH$_2$N[C$_n$H$_{2n}$Si(OR$^3$)$_3$](CO)NH—}$_c$ (II)

or any mixtures of (I) and (II);

wherein

X=[O(CH$_2$)$_4$]$_q$(OC$_2$H$_4$)$_x$(OC$_3$H$_6$)$_y$[O(CH$_2$)$_5$(CO)]$_z$;

q=0 to 10;

x=0 to 20;

y=0 to 20;

z=0 to 10;

n=2 or 3;

a=1 or 2;

b=0 to 4;

c=1 to 5;

R$^1$=—C$_2$H$_4$—, —C$_3$H$_6$—, —C$_4$H$_8$—, —CH(CH$_2$O(CO)R$^5$)CH$_2$— or —CH$_2$CH(O(CO)R$^5$)CH$_2$—;

R$^2$=H or CH$_3$;

R$^3$=C1 to C4 alkyl;

R$^4$=a+b+c-valent, saturated hydrocarbon residue of a (cyclo)alkane polyol with a+b+c hydroxyl groups;

R$^5$=an acid residue of a monocarboxylic acid, with the proviso that a+b+c=3 to 6 and wherein the sequence of the subformulae indicated q, x, y and z may be varied at will and q, x, y and z in each case merely state the number of instances of the particular subformulae contained in the formulae (I) and (II).

2. The polyurethaneurea resins of claim 1, wherein groups (I) or (II) or (I) and (II) are present in an amount corresponding to a silicon content of 1.4 to 5 wt. %.

3. The polyurethaneurea resins of claim 1, wherein the polyurethaneurea resins contain at least one further functional group in addition to groups (I) and/or (II).

4. The polyurethaneurea resins of claim 3, wherein the at least one further functional group is selected from the group consisting of isocyanate groups, carboxyl groups, (meth)acryloyl groups, hydroxyl groups and trialkoxysilane functions which are present other than as a constituent of groups (I) or (II).

5. A process for the production of the polyurethaneurea resins of claim 1 comprising the successive steps:

a) reaction of an aminoalkyltrialkoxysilane comprising a primary amino group with at least one compound selected from the group consisting of compounds of the formula (III)

HXOR$^1$O(CO)CR$^2$=CH$_2$ (III)

and compounds of the formula (IV)

{HXO}$_a$R$^4${O(CO)CR$^2$=CH$_2$}$_{b+c}$ (IV), wherein

X=[O(CH$_2$)$_4$]$_q$(OC$_2$H$_4$)$_x$(OC$_3$H$_6$)$_y$[O(CH$_2$)$_5$(CO)]$_z$;

q=0 to 10;

x=0 to 20;

y=0 to 20;

z=0 to 10;

n=2 to 3;

a=1 or 2;

b=0 to 4;

c=1 to 5;

R$^1$=—C$_2$H$_4$—, —C$_3$H$_6$—, —C$_4$H$_8$—, —CH(CH$_2$O(CO)R$^5$)CH$_2$— or —CH$_2$CH(O(CO)R$^5$)CH$_2$—;

R$^2$=H or CH$_3$;

R$^3$=C1 to C4 alkyl;

R$^4$=a+b+c-valent, saturated hydrocarbon residue of a (cyclo)alkane polyol with a+b+c hydroxyl groups;

R$^5$=acid residue of a monocarboxylic acid, with the proviso that a+b+c=3 to 6 and wherein the sequence of the subformulae indicated q, x, y and z may be varied at will and q, x, y and z in each case merely state the number of instances of the particular subformulae contained in the formulae (III) and (IV), to form at least one simultaneously hydroxy-, secondary amino- and trialkoxysilane-functional preadduct, b) reaction of the at least one preadduct formed in step a) with an isocyanate component selected from the group consisting of polyisocyanate, isocyanate-functional polyurethane prepolymer, isocyanate-functional polyurethaneurea prepolymer and combinations thereof with consumption of the hydroxyl and secondary amino groups of the at least one preadduct.

6. A process for the production of the polyurethaneurea resins of claim 1 comprising the successive steps:

a) reaction of an isocyanate component selected from the group consisting of polyisocyanate, isocyanate-functional polyurethane prepolymer, isocyanate-functional polyurethaneurea prepolymer and combinations thereof with at least one compound selected from the group consisting of compounds of the formula (III)

$$HXOR^1O(CO)CR^2=CH_2 \quad (III)$$

and compounds of the formula (IV)

$$\{HXO\}_a R^4 \{O(CO)CR^2=CH_2\}_{b+c} \quad (IV),$$

wherein $X=[O(CH_2)_4]_q(OC_2H_4)_x(OC_3H_6)_y[O(CH_2)_5(CO)]_z$;
$q=0$ to $10$;
$x=0$ to $20$;
$y=0$ to $20$;
$z=0$ to $10$;
$n=2$ or $3$;
$a=1$ or $2$;
$b=0$ to $4$;
$c=1$ to $5$;
$R^1=-C_2H_4-, -C_3H_6-, -C_4H_8-, -CH(CH_2O(CO)R^5)CH_2-; -CH_2CH(O(CO)R^5)CH_2-$;
$R^2=H$ or $CH_3$;
$R^3=C1$ to $C4$ alkyl;
$R^4=a+b+c$-valent, saturated hydrocarbon residue of a (cyclo)alkane polyol with $a+b+c$ hydroxyl groups;
$R^5=$acid residue of a monocarboxylic acid, with the proviso that $a+b+c=3$ to $6$ and wherein the sequence of the subformulae indicated q, x, y and z may be varied at will and q, x, y and z in each case merely state the number of instances of the particular subformulae contained in the formulae (III) and (IV)

with consumption of the isocyanate groups, b) addition of aminoalkyltrialkoxysilane with the nucleophilic primary amino group onto (meth)acryloyl groups of the reaction product obtained in step a) with complete consumption of the primary amino groups and conversion into secondary amino groups, c) reaction of the reaction product obtained in step b) with a further isocyanate component selected from the group consisting of polyisocyanate, isocyanate-functional polyurethane prepolymer, isocyanate-functional polyurethaneurea prepolymer and combinations thereof with formation of urea bridges.

7. Compositions containing at least one polyurethaneurea resin of claim 1.

8. The compositions of claim 7 selected from the group consisting of adhesives, sealants and coating compositions.

* * * * *